FULL-WAVE MAGNETIC AMPLIFIER

Filed Feb. 6, 1953 2 Sheets-Sheet 1

INVENTOR
EDWARD T. HOOPER, JR.

BY

ATTORNEYS

FULL-WAVE MAGNETIC AMPLIFIER

Filed Feb. 6, 1953 2 Sheets-Sheet 2

INVENTOR
EDWARD T. HOOPER, JR.

BY
G. D. O'Brien
R. M. Hicks
ATTORNEYS

United States Patent Office 2,907,946

Patented Oct. 6, 1959

2,907,946

FULL-WAVE MAGNETIC AMPLIFIER

Edward T. Hooper, Jr., Hyattsville, Md., assignor to the United States of America as represented by the Secretary of the Navy Application February 6, 1953, Serial No. 335,619

4 Claims. (Cl. 323—89)

(Granted under Title 35, U.S. Code (1952), sec. 266)

The invention described herein may be manufactured and used by or for the Government of the United States of America for governmental purposes without the payment of any royalties thereon or therefor.

This invention relates to magnetic amplifiers and more particularly pertains to a full wave type magnetic amplifier.

The control of full-wave current loads can be achieved by the use of a self-saturating magnetic amplifier or a conventional saturable reactor amplifier. In the self-saturating magnetic amplifier, unidirectional impedance elements are employed in the load circuit and consequently two cores and two unidirectional impedance elements per stage of amplification must be used to achieve full-wave output.

If the self-saturating magnetic amplifier is controlled in such a manner that a complete control circuit embraces only the core or cores saturating on a given half cycle then the inherent speed of response of one cycle of the supply voltage is obtained. Since the core is saturated once during each cycle of the power supply voltage applied to the load winding, the reactance of the control windings is made negligible once each cycle of the supply voltage and consequently the control flux may be set in the core with no more than one cycle delay.

In the conventional saturable reactor amplifier, full-wave output can be achieved from one core using A.-C. control or from a two core system using D.-C. control. However, the conventional saturable reactor amplifier has a low gain and a slow speed of response which can only be remedied by using a high resistance in the control circuit thereby further reducing the amplifier gain.

The magnet amplifier of the present invention delivers full-wave output from one core with D.-C. control and with no unidirectional impedances in the output circuit. In addition it possesses an inherent speed of response of one and a half cycles and the high gain normally associated with self-saturating magnetic amplifiers. The current through the load winding on the core is determined by the impedance circuit connected so as to effectively shunt the load winding on the core. The impedance circuit has characteristics such that during one half cycle of the supply voltage a high shunt impedance is presented to the load winding until the flux in the core reaches a predetermined value determined by the impedance circuit at which time a low shunt impedance is presented to the load winding and the load winding is effectively short circuited whereby the flux in the core is locked at that value for the remainder of the half cycle. The amplifier load winding is thus effectively shunted for a variable portion of one half cycle and load current flows through the output circuit during that portion of the half cycle. Since the flux level in the core is locked at a predetermined value for the remainder of the first half cycle, the flux level is preset for the succeeding half cycle of the supply voltage and if rectangular hysteresis loop core material is utilized, the core will saturate during the second half cycle at substantially the same point that it began to function as a shorted transformer during the first half cycle. Because of the manner in which the flux level is preset in the core, the amplifier has a high gain and a good speed of response.

An important object of this invention is to provide a magnetic amplifier for controlling full-wave output currents from one core with D.-C. control.

Another object of this invention is to provide a magnetic amplifier having high gain and a high inherent speed of response, which amplifier controls full-wave output currents.

A further object of this invention is to provide a magnetic amplifier for controlling full-wave currents from one core in which the load winding on the core is effectively short circuited for a portion of one half cycle of the supply voltage when the flux level in the core reaches a selectively variable value determined by a control signal whereby load current flows for a selectively variable portion of one half cycle of the supply voltage and the control flux level in the core is preset so that the core saturates at a point on the succeeding half cycle corresponding to the point at which the load winding was effectively short circuited on the preceding half cycle.

Other objects and many of the attendant advantages of this invention will be readily appreciated as the same becomes better understood by reference to the following detailed description when considered in connection with the accompanying drawings wherein.

Figure 1:
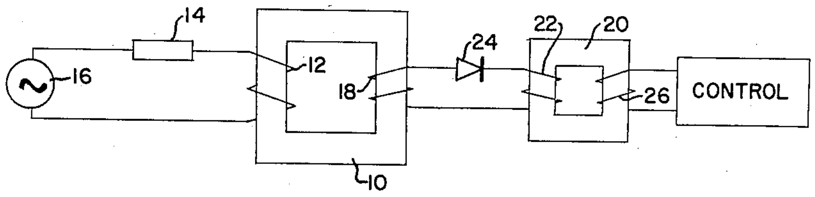
Fig. 1 is a schematic diagram of one embodiment of the invention for controlling full-wave currents by half cycle control signals.

Reference is now made more specifically to Fig. 1 of the drawings. The core 10 is preferably formed of a magnetic material such as Orthonol having rectangular hysteresis loop characteristics. The load circuit comprises a load or controlled winding 12, a load 14 and a power supply source 16. The current flow through the load circuit is determined by the impedance circuit connected to the control winding 18 on the core 10. In the preferred form of the invention illustrated, the impedance circuit includes a saturable core 20 of rectangular hysteresis loop material having a controlled winding 22 thereon connected through a unidirectional impedance element 24 to the control winding 18 on core 10. A control winding 26 on core 20 is adapted to be energized from any suitable control source.

Figure 2:
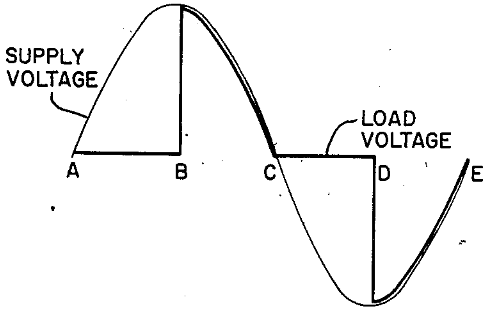
Fig. 2 is a set of curves illustrating the variations in load current with supply voltage under fixed control signal conditions.
Figure 3:
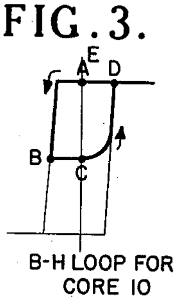
Fig. 3 is a curve illustrating the flux change in the output core during one cycle of supply voltage.

The operation of the magnetic amplifier can best be understood by reference to Figs. 2 and 3. In Fig. 2, the variations in the voltage and current flow through the load circuit with time are illustrated. Fig. 3 illustrates the B-H loop for core 10. Consider the operation of the circuit during the period shown in Fig. 2 from A to B. Since the drop across rectifier 24 in the forward direction is negligible, the induced voltage in the control winding of core 10 is absorbed by the flux change in core 20 until the latter saturates as determined by its control. During this time a high impedance is reflected back into the power circuit and the A.-C. supply voltage is absorbed by the flux change in core 10. This flux change from point A to point B is shown in Fig. 3. At point B when core 20 saturates, the impedance circuit presents a low impedance to the control winding 18 of core 10. The reflected impedance appears as an effective "short" to the controlled winding 12, thereby locking the flux in core 10 at that level for the remainder of the half cycle of the supply voltage. Since there is no flux change in core 10 during the period from B to C, the supply voltage appears across the load 14 and load current flows as illustrated in Fig. 2.

Up to this point, core 10 in effect imitated the self-saturating operation of core 20. Not only has core 10 performed this function during the first half cycle of the supply voltage, but due to its locked flux level, core 10 is preset for the next half cycle. Since the flux change from C to D equals that from A to B (see Fig. 3), core 10 saturates at the same point in the second half cycle that it began to function as a shorted transformer in the first half cycle. Thus at point D, since no further flux change occurs, nearly all of the supply voltage appears across the load impedance 14 and load current flows as in the preceding half cycle. If the impedance presented to the control winding 18 is not sufficiently low to be a short circuit, the "locking" of the flux level is not complete. A slight change in flux through the remainder of the half cycle causes the firing angle on the next half cycle to lag by an amount which varies as a function of the impedance.

It is possible to make the impedance presented to the control circuit 18 very low by the use of saturable reactor devices and consequently Fig. 1 illustrates the preferred embodiment of the invention. Alternatively, a grid controlled gas discharge tube may be utilized in lieu of the rectifier-reactor impedance circuit illustrated. The plate-cathode path of the discharge tube would be connected across the control winding 18 of core 10, and the control signal applied to the grid of the discharge tube to control the firing thereof.

In order to adapt the flux-locking magnetic amplifier for operation in a servo system it is necessary to provide phase reversible output current. This is achieved by providing a pair of output cores having the load windings thereof arranged so that the load currents flowing therethrough are applied to the load in phase opposition.

Figure 4:
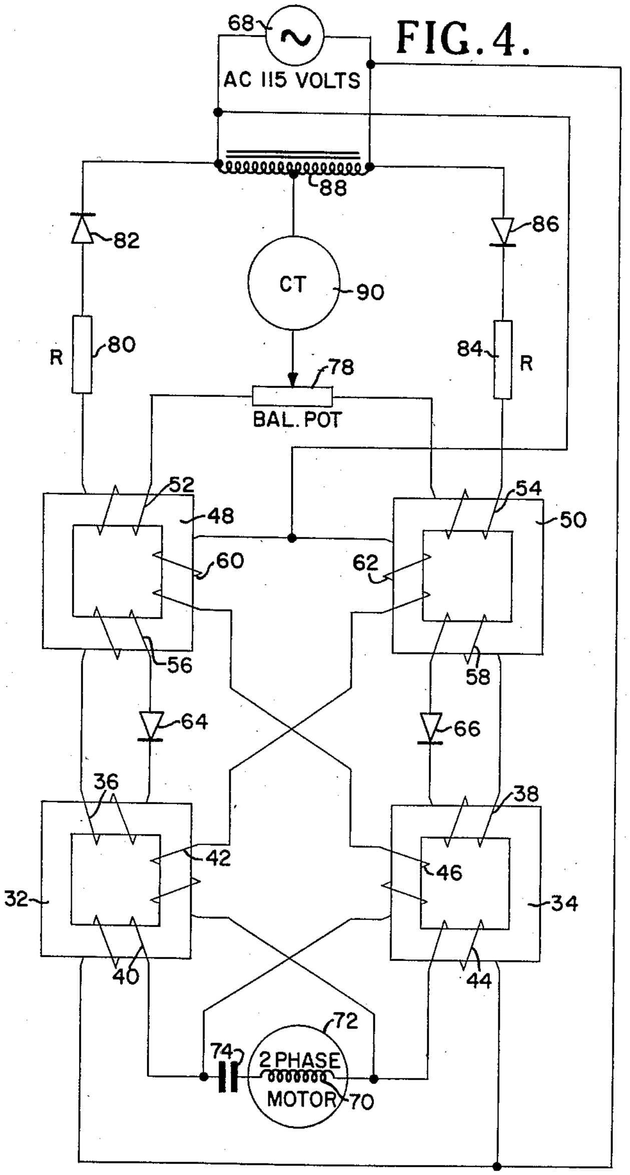
Fig. 4 is a schematic diagram of a second embodiment of the invention having phase reversible output.

Reference is now made more specifically to Fig. 4 of the drawings. A pair of saturable reactor output cores 32 and 34 are provided with control windings 36 and 38. Split load or controlled windings 40 and 42 are provided on core 32 and split load windings 44 and 46 are provided on core 34. Input cores 48 and 50 are provided with control windings 52 and 54, load or controlled windings 56 and 58 and feedback windings 60 and 62 respectively. Load windings 56 and 58 are respectively connected to control windings 36 and 38 through unidirectional impedance elements 64 and 66. The load and feedback windings are connected to form a bridge, load windings 40 and 44 forming one pair of adjacent legs of the bridge, the series circuit including load winding 42 and feedback winding 62 forming another leg of the bridge and the series circuit including load winding 46 and feedback winding 60 forming the fourth leg of the bridge. The bridge is energized from a source of A.-C. potential 68 and the load includes one winding 70 of a two-phase motor 72 and a phasing capacitor 74.

Control flux may be established in the input cores 48 and 50 in any desired manner such as the combination biasing and control circuit illustrated. The control circuit comprises a bridge, one of the legs of which is formed by the balancing potentiometer 78, control winding 52, resistor 80 and rectifier 82, a second leg of the bridge being formed by the balancing potentiometer 78, control winding 54, resistor 84 and rectifier 86. The other two legs of the bridge are formed by the center-tapped inductance 88. A.-C. potential from the supply source 68 is applied across the inductance 88 and A.-C. control voltage from source 90 is applied across the other corners of the bridge, i.e. to the taps on the potentiometer 78 and inductance 88.

As is deemed apparent, the control circuit supplies a half-way reference voltage to the control windings from an A.-C. supply source and half-wave control voltage from a full-wave control source.

In operation, the tap on the potentiometer 78 is adjusted so that under zero control signal conditions, both cores 48 and 50 fire at the same phase angle so that the load currents through windings 40 and 44 are equal and opposite and no current flows through the winding 70 of motor 72. When a control signal is applied from control source 90, the firing angle of one of the input stage cores will be advanced and the other retarded whereby load current flows through the winding 70 of motor 72 of a magnitude and phase determined by magnitude and phase of the control voltage relative to the supply voltage.

Figure 5:
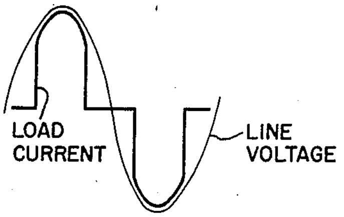
Fig. 5 is a set of curves illustrating the flow of load current through the load impedance.

Referring more specifically to Fig. 5, let it be assumed that a control signal is applied of a phase such as to cause the firing angle of core 48 to be advanced and the firing angle of core 50 to be retarded. Load current then flows through the winding 70 of motor 72 during one half cycle of the supply voltage between the point at which core 48 saturates and the point at which core 50 saturates. At the end of the first half cycle, the flux level in cores 32 and 34 are preset to levels such that cores 32 and 34 respectively saturate in the second half cycle at substantially the same points of the supply voltage that cores 48 and 50 saturated in the preceding half cycle and load current flows during the second half cycle between the points at which cores 32 and 34 saturate. If the control is such that core 50 is caused to saturate before core 48, the firing order of the input and output cores is reversed and the phase of the current flows through the winding 70 is reversed.

Figure 6:
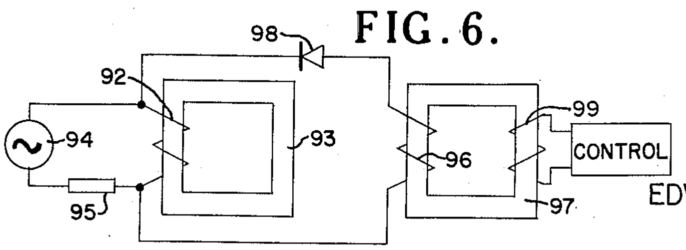
Fig. 6 is a schematic diagram of a modified form of the invention.

In the embodiment illustrated in Fig. 6, the load winding 92 on the output core 93 is energized from a source of A.-C. potential 94 through a load 95. A variable impedance control circuit including the load winding 96 on the input core 97 and a unidirectional impedance element 98 is connected in shunt with the load winding 92 on the output core 93. The impedance of the control circuit is varied by a control signal applied to the control winding 99 on core 97.

The operation of the magnetic amplifier illustrated in Fig. 6 is similar to the operation of the embodiment illustrated in Fig. 1. Briefly, core 97 saturates at a point during one-half-cycle of the supply voltage determined by the control signal applied to the control winding 99 thereon and effectively short circuits the load winding 92 on core 93 and locks the flux level therein thereby causing load current to flow through the load 95. During the succeeding half cycle, the unidirectional impedance 98 is non-conducting and a high impedance is presented in shunt with the load windings 92 whereby core 93 saturates at a point determined by the flux level preset therein during the preceding half cycle and corresponding to the point at which the load winding was effectively short circuited during the preceding half cycle.

The embodiment of Fig. 1 thus differs from the embodiment illustrated in Fig. 6 primarily in that the load winding of the output stage in Fig. 1 is effectively shorted by the transformer action of the output stage core whereby the shorted control winding on the output stage core appears as a short to the load windings. In the embodiment illustrated in Fig. 6, shorting of the output stage load winding is directly achieved by the unidirectional impedance circuit connected in shunt therewith.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent is:

1. A full wave magnetic amplifier comprising an output core of magnetic material having definite saturation characteristics, a control winding and a controlled winding on said output core, an input core of magnetic material having definite saturation characteristics, a control winding and a controlled winding on said input core, means including a unidirectional impedance element connecting the input core controlled winding to the output core control winding, an output load circuit connected to the controlled winding of said output core, energizing means connected to said load circuit and the controlled winding of said output core to form a closed series circuit for applying an A.-C. voltage to the output core controlled winding whereby the input core is driven to saturation during each half cycle of the A.-C. voltage and the flux in the output core is locked at a predetermined level for the remainder of each respective half cycle to thereby produce a controlled full-wave output current wave-form.

2. A full-wave magnetic amplifier having a controllable current wave-form comprising, in combination, a first core of magnetic material having a definite saturation characteristic, a source of alternating current voltage, a coil wound on said first core and adapted to be energized by said current source, a load output circuit connected to said source and said coil to form a closed series circuit therewith, a second core, a primary winding and a secondary winding wound on said second core, a unidirectional conductive device connected in series with said secondary winding, said unidirectional conductive device and said secondary winding being effectively coupled in shunt with said coil for effectively short circuiting said coil during a portion of one half cycle of the source voltage to thereby lock the flux in said first core at a predetermined level whereby load current flows through said coil for the remainder of the half cycle and the flux level in said first core is preset for the second half cycle of the source voltage so that said first core saturates at a point during the second half cycle of the source voltage corresponding to the point at which said coil was effectively shorted during the first half cycle, and a selectively variable energizing control source connected to said primary winding for determining said predetermined level at which the flux in said first core is locked.

3. The device of claim 2, wherein the series arrangement of said unidirectional conductive device and said secondary winding is connected in parallel with said coil.

4. The device of claim 2, further including a second coil wound on said first core and adaptable to have a voltage induced therein in response to energization of said first mentioned coil by said source, the series arrangement of said unidirectional conductive device and said secondary winding being connected across said second coil.

References Cited in the file of this patent

UNITED STATES PATENTS

| | | |
|---|---|---|
| 1,968,346 | Neiss | July 31, 1934 |
| 2,054,496 | Craig | Sept. 15, 1936 |
| 2,365,611 | White | Dec. 19, 1944 |
| 2,497,218 | Hart | Feb. 14, 1950 |
| 2,654,080 | Browne | Sept. 29, 1953 |
| 2,754,474 | Barnhart | July 10, 1956 |